(No Model.)
J. P. LAUER & A. VEIDERS.
MEASURING DEVICE FOR OIL TANKS.
No. 327,560. Patented Oct. 6, 1885.
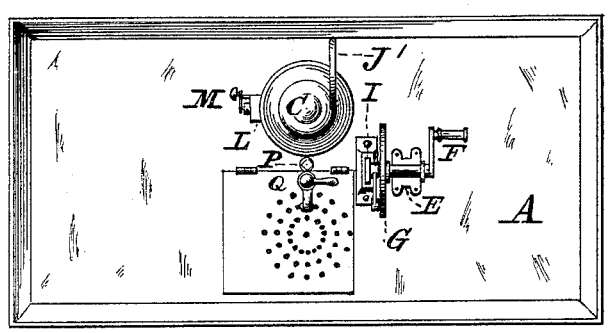
FIG. 1.
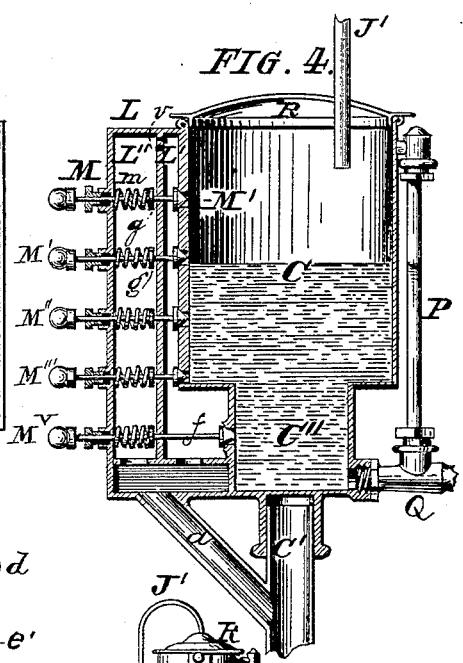
FIG. 4.
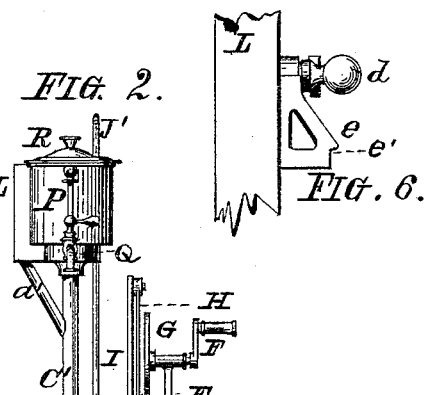
FIG. 2. FIG. 6.
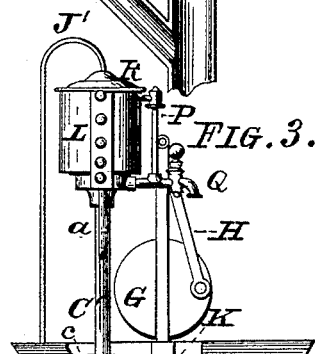
FIG. 3.
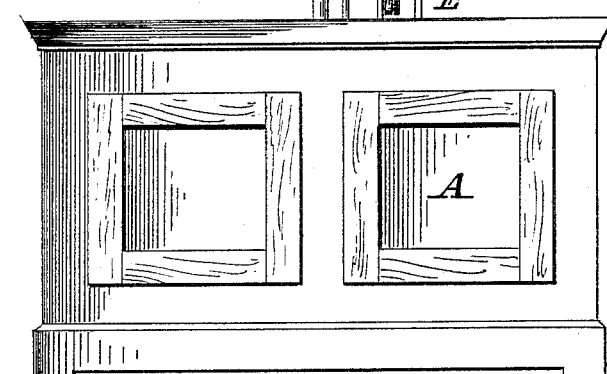
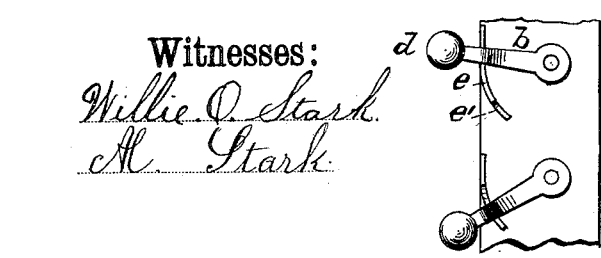
FIG. 5.
Witnesses:
Willie O. Stark.
A. Stark.
Inventors:
Jean P. Lauer
Anton Veiders,
by Michael J. Stark,
Attorney.
N. PETERS, Photo-Lithographer, Washington, D. C.

UNITED STATES PATENT OFFICE.

JEAN P. LAUER AND ANTON VEIDERS, OF BUFFALO, NEW YORK.

MEASURING DEVICE FOR OIL-TANKS.

SPECIFICATION forming part of Letters Patent No. 327,560, dated October 6, 1885.

Application filed July 6, 1885. Serial No. 170,762. (No model.)

*To all whom it may concern:*

Be it known that we, JEAN P. LAUER and ANTON VEIDERS, both of Buffalo, Erie county, New York, have jointly invented certain new and useful Improvements on a Measuring Device for Oil-Tanks, &c.; and we do hereby declare that the following description of our said invention, taken in connection with the accompanying sheet of drawings, forms a full, clear, and exact specification, which will enable others skilled in the art to which it appertains to make and use the same.

Our present invention has general reference to a measuring device for oil-tanks; and it consists, essentially, in the novel and peculiar combination of parts and details of construction, as hereinafter first fully set forth and described, and then pointed out in the claims.

The object of our invention is the production of a simple and efficient mechanism for measuring liquids—such as oil taken from an oil-tank—and for analogous purposes. To attain this end we construct our measuring device substantially as illustrated in the accompanying drawings, in which—

Figure 1 is a plan, and Fig. 2 a side elevation, of an oil-tank provided with our improved measuring device. Fig. 3 is an end elevation, parts being broken away to show the interior construction of the apparatus. Fig. 4 is a longitudinal sectional elevation through the measuring-reservoir. Fig. 5 is a side view of the handles for the valves. Fig. 6 is an end view, and Fig. 7 a plan, of the same.

Like parts are designated by corresponding letters of reference in all the various figures.

A in the drawings represents the usual oil-tank having a pump-cylinder, B, and other suitable mechanism, hereinafter to be referred to, for forcing oil (kerosene, lubricating, or other oil) from the said tank through the measuring device into a vessel to be filled.

C is the measuring-reservoir. It is affixed to the upper end of a vertically-arranged pipe, C', and it consists of the main portion C and a lower contracted part, C''. To this reservoir is affixed a double valve-chamber, L' L'', communicating with the interior of the said reservoir by means of a series of valves, M M' M'', &c., there being five (more or less) of said valves within the before-mentioned chambers.

The construction of the valves is non-essential; but they may consist each of a stem, *f*, Fig. 4, provided on one end with the usual taper valve, and on the opposite end with a crank-handle, *b*, having a knob, *d*, for conveniently handling said crank. In the chamber L'' the valve-stems have collars *g* and spiral springs *m*, by means of which the valves are kept closed.

On the exterior of the valve-chambers L there are provided curved guides *e*, having inclines, as shown in Fig. 6, and a notch or stop, *e'*. These guides serve to move the valves off their seats when the crank-handles are depressed, and thereby to establish communication between the reservoir C and the valve-chamber L'. From this valve-chamber leads a duct, *a*, into the stand-pipe C', so as to convey the liquid passing from the reservoir C through the valve-chamber L' back into the tank A.

The pumping mechanism to convey the liquid in the tank A into the measuring-reservoir C consists, essentially, of a force-pump, B, of any well known construction, the piston-rod I of which passes through a guide-socket, K, Fig. 3, and connects with a crank-disk, G, through a connecting-rod, H. The crank-disk G has an axle or shaft revolving within a standard, E, Fig. 2, and is operated by means of a crank, F, as clearly illustrated in the various figures.

The liquid passes from the pump-cylinder through the pipe J upward, and into the reservoir C by the return-pipe J', passing through the cover R of said reservoir C. The liquid is discharged from the reservoir C through a faucet, Q, and the height of the same within the said reservoir is ascertained by means of a glass gage or indicator, P.

In operation it is assumed that liquid is to be drawn from the tank A in a predetermined quantity. It is further assumed that the contents of the reservoir C up to the uppermost valve, M, is exactly one gallon, while the height up to the valves M⁵, M''', M'', and M' is respectively one pint, one quart, two quarts, and three quarts, and that whenever any one of these valves is opened the reservoir C cannot be filled farther than up to the respective valve. Now, supposing that two quarts of liquid are to be measured, then valve M″ is opened and the pump operated so as to fill the reservoir. As soon as the liquid reaches the passage governed by the said valve M″, the surplus will escape through this passage back into the tank A by way of the valve-chamber L′, pipes a and C′.

In the reservoir C there is an uncovered vent-opening, v, Fig. 4, being at the highest point to which the reservoir may be filled, said opening acting also as an overflow to guard against the reservoir being filled beyond its capacity.

It will be readily observed that the measuring of the liquid is easily and readily performed, and that the entire apparatus is as simple in construction as a device of the class described may be arranged.

Having thus fully described our invention, we claim as new and desire to secure to us by Letters Patent of the United States—

1. As an improved article of manufacture, a combined oil-tank and measuring device, consisting, essentially, of a suitable tank, A, having a stationary pump, B, and suitable mechanism for operating the same, the oil-conducting pipe J, hollow standard C′, carrying on its upper end the receiving-vessel C, provided with contracted portion C″, a series of escape-valves located within a double chamber attached to said receiving-vessel, and a discharge-duct from the said double chamber through the hollow standard, the whole being constructed and organized substantially in the manner as and for the purpose stated.

2. The combination, with the reservoir C, having the contracted portion C″, of the double valve-chamber L′ L″ and a series of valves, M, and a suitable return-pipe, the whole being constructed and combined in a manner substantially as and for the object stated.

In testimony that we claim the foregoing as our invention we have hereto set our hands in the presence of two subscribing witnesses.

JEAN P. LAUER.
A. VEIDERS.

Attest:
MICHAEL J. STARK,
WILLIE O. STARK.